United States Patent [19]

Sugiyama

[11] Patent Number: 5,382,858
[45] Date of Patent: Jan. 17, 1995

[54] DRIVING MOTOR FOR AN ELECTRIC CAR

[75] Inventor: Takeshi Sugiyama, Hyogo, Japan

[73] Assignee: Mitsubishi Denki Kabushiki Kaisha, Tokyo, Japan

[21] Appl. No.: 85,034

[22] Filed: Jul. 2, 1993

[30] Foreign Application Priority Data

Jul. 7, 1992 [JP] Japan .................. 4-204358

[51] Int. Cl.⁶ .............................................. H02K 5/16
[52] U.S. Cl. ........................................ 310/90; 310/83;
310/89; 384/461; 384/494
[58] Field of Search ................ 310/166, 190, 83, 209,
310/90, 89, 75 R, 45, 91; 384/494, 461;
277/152; 475/149

[56] References Cited

U.S. PATENT DOCUMENTS

| | | | |
|---|---|---|---|
| 4,587,861 | 5/1986 | Morishita | 310/83 |
| 5,228,845 | 7/1993 | Steele | 384/461 |
| 5,300,848 | 4/1994 | Huss et al. | 310/83 |

FOREIGN PATENT DOCUMENTS

| | | |
|---|---|---|
| 4-34860 | 3/1992 | Japan . |
| 2109893 | 6/1983 | United Kingdom . |
| 2125928 | 3/1984 | United Kingdom . |

*Primary Examiner*—R. Skudy
*Attorney, Agent, or Firm*—Sughrue, Mion, Zinn, Macpeak & Seas

[57] ABSTRACT

An electric motor for an electric car, in which an outer ring of a ball bearing used in the non-work side of a rotating shaft is supported fixedly by a rear bracket so that the shaft is fixed in the axial direction move. A cylindrical roller bearing is used in the work side of the rotating shaft, so that the rotating shaft is secured to the inner periphery of the rear end of an output carrier of an epicycle reduction gear and the outer periphery of the rear end of the carrier is supported through a ball bearing by an intermediate bracket. An oil seal is provided for sealing between the intermediate bracket and the rotating shaft, the inner diameter of the oil seal being greater than an outer diameter of the inner ring of the cylindrical roller bearing.

4 Claims, 1 Drawing Sheet 5,382,858

DRIVING MOTOR FOR AN ELECTRIC CAR

BACKGROUND OF THE INVENTION

The invention relates to a driving motor for an electric car which rotates an input shaft of the electric car.

FIG. 2 is a longitudinal section view of a prior art driving motor for an electric car. In the figure, 1 designates an induction motor having the following configuration. The reference numeral 2 designates a stator core having slots in which a stator winding 3 is formed, 4 designates a rotor core secured to a rotating shaft 8, and 5 designates rotor conductors which are disposed in slots of the rotor core 4 and connected to each other by end rings 6 to be united into one body. The reference numeral 7 designates fans formed on the end rings 6, 9 designates an intermediate bracket, 10 designates a front bracket at an output (work) side of the motor, and 11 designates a rear bracket at non-work side of the motor. These brackets and the stator core 2 are combined with each other by through bolts 12. The front end portion of the rotating shaft 8 is supported through a ball bearing 13 by the intermediate bracket 9, and the rear end portion is supported through a ball bearing 14 by the rear bracket 11. The reference numeral 15 designates baffle plates which are disposed inside the intermediate bracket 9 and partition the space into an inlet and-outlet for cooling air.

The reference numeral 16 designates an epicycle reduction gear having the following configuration. The reference numeral 17 designates a sun gear which is a pinion positioned at the front end of the rotating shaft 8, and 18 designates a plurality of planet gears which engage with the sun gear 17 and are supported through a bearing 20 by a supporting pin 19. The reference numeral 21 designates an internal gear which is fixed to the inside of the front bracket 10 and functions so as to revolve the engaging planet gears 18, and 22 designates an output carrier to which the supporting pin 19 is fixed and which transmits the reduced rotation. The front portion of the output carrier 22 is supported through a ball bearing 23 by the front bracket 10, and the rear end is supported through a ball bearing 24 by the intermediate bracket 9.

The reference numerals 25 and 26 designate oil seals for sealing the lubricating oil in the epicycle reduction gear 16, 27 designates a cap fitted onto a lubricating oil supply port of the intermediate bracket 9, and 28 designates a flange coupling which is connected with the shaft end of the output carrier 22 by a key 31 inserted between them and also by a combination of a bolt 30 and a washer 29. The flange coupling 28 is connected with an input shaft of the electric car. The reference numeral 32 designates a speed sensor having a rotating unit attached to the rear end portion of the rotating shaft 8, and a fixed unit supported by the rear bracket 11.

When the electric car is to be driven by the driving motor having this configuration, a low frequency and polyphase (e.g., three-phase) AC voltage is firstly supplied from a power supply mounted on the car, to the induction motor 1. This causes the rotating shaft 8 to rotate at a low speed. This rotation is reduced in speed by the epicycle reduction gear 16, and then transmitted through the output carrier 22 to the input shaft of the electric car, thereby causing the electric car to run. The speed sensor 32 detects the speed. As the frequency of the voltage supplied to the induction motor 1 is raised, the speed of the electric car is increased.

In the prior art driving motor, the rotating shaft 8 is supported through the ball bearings 13 and 14 by bearing boxes of the intermediate bracket 9 and the rear bracket 11. The axial direction support of the rotating shaft 8 is realized by the configuration in which a step portion of the front end of the shaft is received in the inner end of the inner ring of the ball bearing 13 and a step portion of the rear end is received in the inner end of the inner ring of the ball bearing 14. The outer end of the outer ring of the ball bearing 13 is received by a step portion of a bearing box of the intermediate bracket 9, and the outer end of the outer ring of the ball bearing 14 is received by a step portion of a bearing box of the rear bracket 11. In view of the variation in dimension in the axial direction which is caused by the accumulation of machining dimensional tolerances of the components, the distance between the step portion of the bearing box of the intermediate bracket 9 and the step portion of the bearing box of the rear bracket 11 is previously set to be a sufficiently larger value than the dimension between the outer end of the ball bearing 13 having the inner ring secured to the front end of the rotating shaft 8 and the outer end of the ball bearing 14 having the inner ring fixed to the rear end of the rotating shaft 8.

In such a prior art driving motor for an electric car, the induction motor 1 is so constructed that the distance between the step portion of the bearing box of the intermediate bracket 9 and the step portion of the bearing box of the rear bracket 11 is set to be sufficiently larger than the dimension between the outer ends of the outer rings of the ball bearings 13 and 14 each having the inner rings secured to the rotating shaft 8, and that each of the outer rings is loosely fitted into the inner periphery of the respective bearing box. Therefore, there exists a problem in that the rotating shaft 8 can move in a certain range in the axial direction, thereby causing a noise. Furthermore, there exists another problem in that, as the balls in the bearing boxes of the intermediate bracket 9 and the rear bracket 11 rotate, the outer rings of the ball bearings 13 and 14 slowly rotate to produce streaks or scratches due to abrasion on the outer surfaces of the outer rings and inner surfaces of the bearing boxes, thereby causing the bearings to be damaged.

The inner ring of the ball bearing 13 disposed in the load side is pressingly fitted onto the front end portion of the rotating shaft 8. In order to place the oil seal 25 of the load side at its position, therefore, the oil seal 25 must have an inner diameter which is sufficiently large so that the oil seal can pass over the outer diameter of the outer ring of the ball bearing 13, requiring the outer periphery of the rotating shaft 8 which corresponds to and contacts with the oil seal, to have a larger diameter. This causes the rotating shaft to rotate at a higher peripheral speed, resulting in a shortened life and lowered sealing properties of the oil seal 25. Moreover, there arises a problem in that the rotating shaft 8 must be produced from a bar material having a larger diameter.

SUMMARY OF THE INVENTION

The invention has been conducted in order to solve the above-mentioned problems, and has an object of providing a driving motor for an electric car in which the rotating shaft is prevented from moving in the axial direction, thereby lowering the noise level, and the outer periphery of the outer ring of a rolling bearing for the rotating shaft is prevented from being damaged. It is another object of the invention to provide a driving motor in which an oil seal disposed at a position inner than a bearing in the load side of the rotating shaft has a smaller diameter so as to have the lengthened life and improved properties.

In the driving motor for an electric car according to the invention, a ball bearing is disposed in the non-work (rear) side of a rotating shaft in such a manner that the inner ring of the bearing is secured to the rear end portion of the rotating shaft and the outer ring of the bearing is fixedly supported in a bearing receiving portion of a rear bracket so as to fix the axial direction move of the outer ring, a cylindrical roller bearing is disposed in the work (front) side of the rotating shaft in such a manner that the inner ring of the roller bearing is secured to the front end of the rotating shaft and the outer ring of the roller bearing is fixed to the inner periphery of the rear end portion of an output carrier of the epicycle reduction gear, the outer periphery of the front end portion of output carrier is supported through a bearing by a front bracket, and the outer periphery of the rear end portion is supported through a bearing by an intermediate bracket. An oil seal which is attached on the inner periphery of the rear end portion of the intermediate bracket has a diameter which is so small that the inner diameter of the oil seal can pass over the inner ring of the cylindrical roller bearing.

According to the invention, the inner ring of the ball bearing in the non-work side of the rotating shaft is fixed to the rotating shaft, the outer ring is fixed at least in the axial direction to the rear bracket, and the rotating shaft is fixed the axial direction move. Regarding the cylindrical roller bearing in the work side of the rotating shaft, the inner ring is secured to the rotating shaft, and the outer ring is secured to the carrier. However, the outer periphery of the inner ring can move relative to the rollers in the axial direction, and is not restricted by the accumulation of machining dimensional tolerances in the axial direction of the components or by a dimensional change in the axial direction due to a rise in temperature, or can be relieved from these. Therefore, the outer rings of the ball bearing and the cylindrical roller bearing are fixed with respect to the inner periphery of the respective bearing box, so that the outer rings are prevented from moving in the axial direction and from rotating with following the rotation of the balls or rollers. The rotating shaft and the output carrier rotate in the same direction, thereby causing the life of the cylindrical roller bearing to be lengthened. Moreover, the oil seal attached on the inner periphery of the rear end portion of the intermediate bracket has a smaller diameter than that of an oil seal used in the prior art. In accordance with this reduced inner diameter, the outer diameter of the portion of the rotating shaft which corresponds to and contacts with the inner periphery of the oil seal can be reduced so that the peripheral speed is lowered, thereby causing the life of the oil seal to be lengthened.

DETAILED DESCRIPTION OF PREFERRED EMBODIMENT

Figure 1:
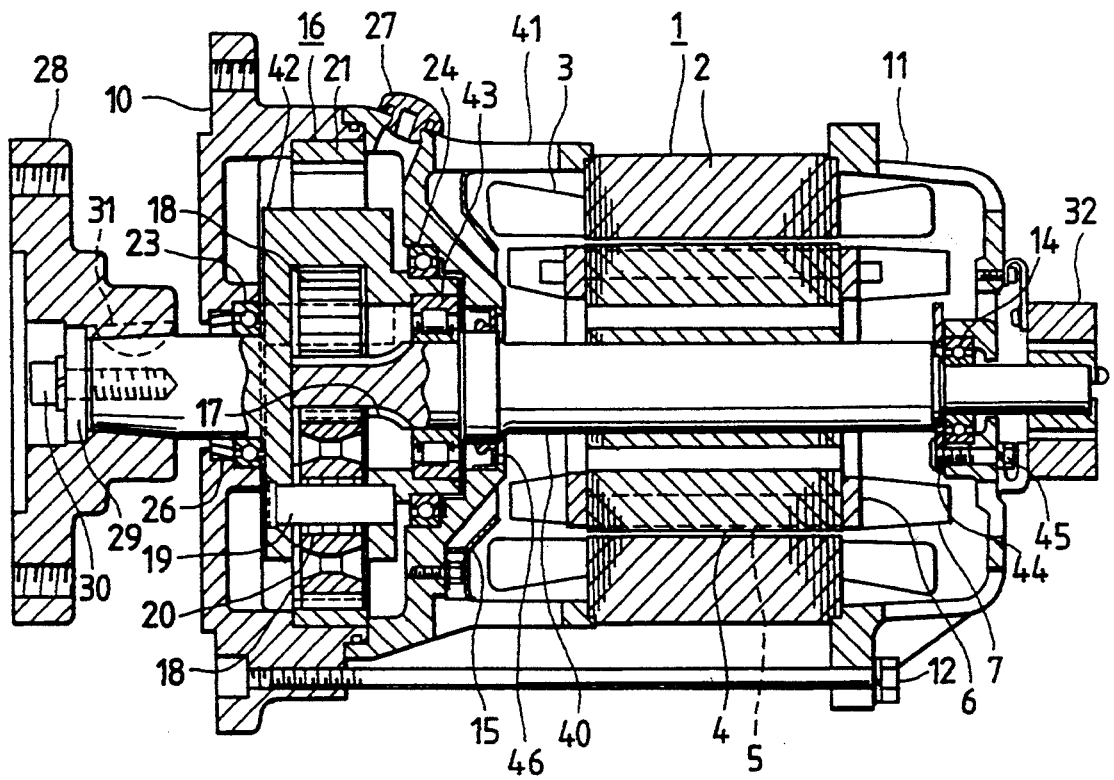
FIG. 1 is a longitudinal section view of a driving motor for an electric car according to an embodiment of the invention.
Figure 2:
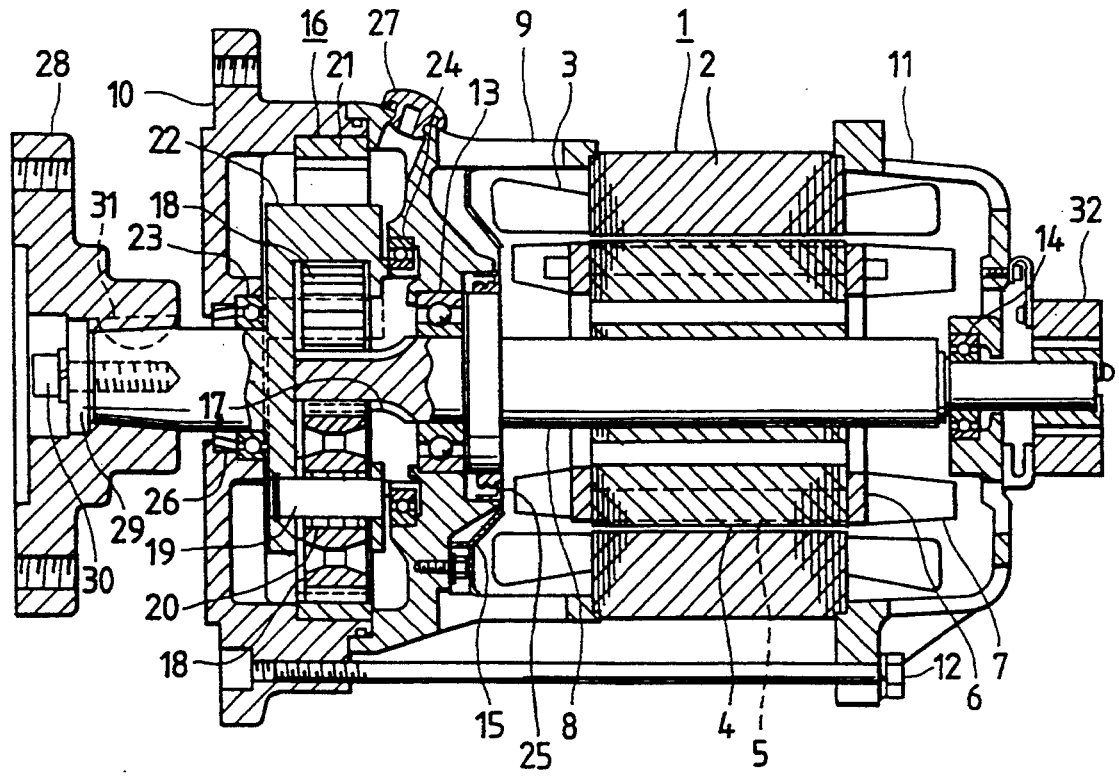
FIG. 2 is a longitudinal section view of a prior art driving motor for an electric car.

FIG. 1 is a longitudinal section view of a driving motor for an electric car according to an Embodiment of the invention. In FIG. 1, the reference numerals 1 to 7, 10 to 12, 14 to 21, 23, 24, and 25 to 32 respectively designate the same components as those of FIG. 2. The reference numeral 40 designates a rotating shaft of the induction motor 1, 41 designates an intermediate bracket, and 42 designates an output carrier of the epicycle reduction gear 16. A front end portion of the output carrier 42 is supported through a ball bearing 23 by the front bracket 10, and a rear end is supported through a ball bearing 24 by the intermediate bracket 41. The work (front) side of the rotating shaft 40 is supported through a cylindrical roller bearing 43 by the output carrier 42, and the non-work (rear) side is supported through the ball bearing 14 by the rear bracket 11. The inner ring of the ball bearing 14 is pressingly fitted onto the rear end portion of the rotating shaft 40 to be fixedly secured thereto. The outer ring of the ball bearing 14 is loosely fitted into the inner periphery of the bearing box of the rear bracket 11, and an end cover 44 is placed on the front side end of the outer ring and fastened by bolts 45 at the rear bracket 11 so that the outer ring is secured to the bearing box. In this way, the ball bearing 14 is fixed at least the axial direction move, and the rotation of the outer ring following the shaft rotation is prevented from occurring. This configuration blocks the axial direction move of the rotating shaft 40. Regarding the cylindrical roller bearing 43 in the work side, the inner ring is pressingly fitted onto the front end portion of the rotating shaft 40 to be secured thereto, and the outer ring is tightly fitted into the inner periphery of the rear end of the output carrier. The inner ring can move in the axial direction relative to the rollers which contact with the outer periphery of the inner ring. Therefore, the non-work side of the rotating shaft 40 is fixed in the axial direction by the ball bearing 14, and the work side is supported in such a manner that it can extend or contract in the axial direction in response to a change in temperature. In this configuration, even when the dimension in the axial direction is caused to change by the accumulation of errors of machining dimensional tolerances in the axial direction of the components or by a rise in temperature, the rotating shaft is not restricted by this dimensional change, and this dimensional change is relieved. Therefore, the rotating shaft 40 is prevented from moving in the axial direction, and the noise level is lowered. Furthermore, the outer rings of the ball bearing 14 and the cylindrical roller bearing 43 are prevented from rotating following the rotation of balls or rollers, thereby eliminating the damage or abrasion of the surface contacting with the inner periphery of the respective bearing box.

In the prior art motor, the outer ring of the ball bearing 13, which is the bearing in the work side, is supported by the stationary intermediate bracket 9. By contrast, in the embodiment, the outer ring of the cylindrical roller bearing 43 is fixed to the output carrier 42. Accordingly, when the inner ring rotates at a speed of N (which is equal to the rotating speed of the rotating shaft 40), the rotating speed $N_1$ (which is equal to the rotating speed of the carrier 42) of the outer ring is $N_1 = N/g$ (where $1/g$ is the reduction ratio). In this way, following the rotation of the inner ring, the outer ring rotates in the same direction at $(1/g)$ times the rotating speed of the inner ring. Therefore, the life of the bearing is lengthened, and the size of the bearing can be reduced.

The reference numeral 46 designates an oil seal attached to the inner periphery of the rear end portion of the intermediate bracket 41. The oil seal 46 has an inner diameter which is greater than the outer diameter of the inner ring of the cylindrical roller bearing 43, or which is smaller than that of the oil seal used in the prior art. This is because that, in the embodiment, the cylindrical roller bearing 43 is so configured that the outer ring and the rollers can be separated from the inner ring. Under the state where the outer ring and the rollers are separated from the inner ring, therefore, the intermediate bracket 41 to which the oil seal 46 is attached can be installed. Accordingly, the diameter of the portion of the rotating shaft 40 which corresponds to and contacts with the oil seal 46 can be reduced, whereby the life of the oil seal 46 is lengthened and the sealing properties of the oil seal 46 are improved. Moreover, the rotating shaft 40 can be produced from a bar material having a smaller diameter.

As described above, according to the invention, the inner ring of the ball bearing in the non-work side of the rotating shaft is secured to the rotating shaft, and the outer ring is fixed to the rear bracket. The bearing in the work side is a cylindrical roller bearing having the inner ring secured to the rotating shaft and the outer ring secured to the output carrier. Accordingly, the rotating shaft is prevented from moving in the axial direction, and the noise level is lowered. Moreover, the life of the cylindrical roller bearing in the work side is lengthened, and the size of the bearing can be reduced. Furthermore, the inner diameter of the oil seal attached to the rear end portion of the intermediate bracket can be reduced, and therefore the life of the oil seal is lengthened and the sealing properties of the oil seal are improved. The rotating shaft has a reduced diameter at the portion which corresponds to and contacts with the oil seal, whereby the rotating shaft is allowed to be produced from a bar material of a small diameter. This can reduce the material cost.

What is claimed is:

1. A driving motor for an electric car having an electric induction section which has a stator and a rotor including a rotating shaft, said driving motor comprising:

a rear bracket for supporting said stator and one end portion of said rotating shaft through a first bearing, an outer ring of said first bearing being fixed on said rear bracket;

a front bracket being disposed at a work side of said rotating shaft and covering said electric induction section together with said rear bracket;

an output carrier, disposed inside a ring gear of an epicyclic reduction gear, secured at a front side thereof by said front bracket through a second bearing, and connected with said one end portion of said rotating shaft, for reducing rotation of said rotating shaft;

a cylindrical roller bearing securing said rotating shaft to said output carrier, an inner ring of said cylindrical roller bearing being secured to said rotating shaft, an outer inner ring of said cylindrical roller bearing being fixed to said output carrier; and an intermediate bracket, disposed between said front bracket and said rear bracket, for securing a rear side of said output carrier through a third bearing.

2. A driving motor according to claim 1, wherein said first bearing is a ball bearing, an inner ring of said ball bearing being secured to said rotating shaft, an outer ring of said ball bearing being supported by a bearing box of said rear bracket so as to fix axial direction movement of said rotating shaft.

3. A driving motor according to claim 1, further comprising an oil seal adapted to said intermediate bracket adjacent to said cylindrical roller bearing to contact said rotating shaft with an inner diameter of said oil seal, for sealing between said intermediate bracket and said rotating shaft, said inner diameter of said oil seal being greater than an outer diameter of said inner ring of said cylindrical roller bearing.

4. A driving motor according to claim 3, further comprising an oil seal for sealing between said front bracket and said rotating shaft.

* * * * *